United States Patent [19]

Blöcker

[11] Patent Number: 4,880,860

[45] Date of Patent: Nov. 14, 1989

[54] POLYESTER MOLDING COMPOSITION, PROCESS FOR ITS PREPARATION AND ITS USE

[75] Inventor: Erich Blöcker, Hofheim am Taunus, Fed. Rep. of Germany

[73] Assignee: Hoechst Aktiengesellschaft, Frankfurt am Main, Fed. Rep. of Germany

[21] Appl. No.: 237,669

[22] Filed: Aug. 25, 1988

Related U.S. Application Data

[63] Continuation of Ser. No. 49,117, May 13, 1987, abandoned.

[30] Foreign Application Priority Data

May 15, 1986 [DE] Fed. Rep. of Germany ....... 3616431

[51] Int. Cl.$^4$ .................................................. C08K 5/34
[52] U.S. Cl. ...................................... 524/94; 524/89; 524/381; 524/394; 524/605; 523/351
[58] Field of Search ................... 524/89, 94, 104, 394, 524/381, 605; 523/351

[56] References Cited

U.S. PATENT DOCUMENTS

| | | | |
|---|---|---|---|
| 3,579,363 | 5/1971 | Sears | 524/94 |
| 3,579,364 | 5/1971 | Sears | 524/94 |
| 3,619,224 | 11/1971 | Inamoto | 524/104 |
| 4,399,244 | 8/1983 | Bier | 524/605 |
| 4,416,839 | 11/1983 | Inata | 521/64 |
| 4,464,240 | 8/1984 | Hansen | 524/94 |
| 4,520,146 | 5/1985 | Hansen | 524/94 |
| 4,639,480 | 1/1987 | Birum | 524/104 |

FOREIGN PATENT DOCUMENTS

214112 3/1987 European Pat. Off. ............. 524/94

OTHER PUBLICATIONS

Kirk-Othmer Encyclopedia of Chemical Technology, vol. 15 p. 755, 1969.

*Primary Examiner*—John C. Bleutge
*Assistant Examiner*—David Buttner

[57] ABSTRACT

The invention relates to polyester molding compositions, comprising substantially the polyester, preferably polyethylene terephthalate, a nucleating agent, a special imide compound as a further crystallization accelerator and, if appropriate, the conventional reinforcing agents and additives. The special crystallization accelerator according to the invention is virtually unreactive with the polyester and, in particular, is considerably more resistant to migration than relevant crystallization accelerators according to the state of the art. The invention also relates to a process for the preparation of these polyester molding compositions.

17 Claims, No Drawings

POLYESTER MOLDING COMPOSITION, PROCESS FOR ITS PREPARATION AND ITS USE

This is a continuation of application Ser. No. 07/049,117, filed May 13, 1987, now abandoned.

The invention relates to a polyester molding composition comprising of a polyester, a nucleating agent, a low-molecular organic compound as crystallization accelerator and if appropriate reinforcing agents or other additives. Further, it is directed to a process for preparing of this molding composition and its use for the preparation of moldings.

It is known that polyethylene terephthalate as compared with polybutylene terephthalate has only a low crystallization tendency or that its crystallization rate is considerably lower. It is also known that the crystallization rate of polyethylene terephthalate can be increased by adding nucleating agents before, during or after the synthesis of the polyester. Since the temperature of the mold in the processing of polyester molding compositions to give moldings by injection-molding should not exceed 110° C. if possible, the polyester must crystallize as readily and quickly as possible at this mold temperature, in order to obtain moldings having good physical properties. In general, this is not achieved by adding only nucleating agents. By additionally using an organic crystallization accelerator, which increases the molecular chain mobility of the polyester in the melt, the crystallization of the polyethylene terephthalate can be improved once more. As a result, the temperature range, within which crystallization can take place on cooling from the melt, is widened. Such a combination of additives to polyethylene terephthalate or also to polyethylene terephthalate/polybutylene terephthalate mixtures for the purpose of preparing rapidly crystallizing polyester compositions has been disclosed, inter alia, by German Pat. Nos. 2,639,428, 2,907,729 and 2,907,779.

However, the addition of an organic crystallization accelerator or plasticizer should not adversely affect other properties of the polyester. In particular, the crystallization accelerator should, on the one hand, be soluble in the polyester but, on the other hand, not react chemically with the polyester and thus effect a degradation of the molecular weight of the polyester. Furthermore, it should also have the lowest possible volatility and a low tendency to migrate. In practice, this means that the incorporated crystallization accelerator should, under a long-term temperature stress on the molding, have the lowest possible migration out of this rapidly crystallizing polyester to the surface, in order to avoid adverse effects on the appearance of the surface and on the physical properties.

The majority of the crystallization accelerators hitherto known for polyethylene terephthalate do not meet these additional requirements. In particular, organic compounds with ester groups lead to a marked degradation of the polyester matrix during the stage in which they are incorporated into the polyester melt. Moreover, the resistance of the conventional crystallization accelerators based on esters, unless they have a high molecular weight, to migration out of the polyester is not sufficient for many applications of the molding compositions in practice.

The addition of certain organic imide compounds to polyethylene terephthalate or polyesters is known. Thus, in U.S. Pat. No. 3,575,931, phthalimide is mentioned as an additive for polyethylene terephthalate, but it serves here as a dispersible nucleating agent, since it is a highly polar organic compound and thus has an action similar to that of metal salts.

In European Pat. No. 029,930, the addition of 3 to 20% by weight of an organic compound having at least one imide group per molecule and a melting point above 240° C. is described. These are imide compounds with aromatic ring systems which are in general substituted by chlorine or bromine and can contain a $C_1$- to $C_6$-alkyl or alkylene radical. Due to their structure and their high melting point, these imide compounds do not act as plasticizers but as nucleating agents, since their melting points are preferentially above the melting point of the polyester matrix. It is also stated that the addition of other nucleating agents is unnecessary or even undesirable. The examples and comparisons show that the imide compounds of lower melting point do not produce the desired properties.

Finally, the European Published Application No. 057,387 describes the preparation of film-type or fibrous structures of aromatic polyesters by the use of additives which reduce the melt viscosity and which, after stretching of the films or fibers, can be dissolved out again by extraction with solvents and thus removed again. Amongst low-molecular compounds which are miscible with polyesters but virtually unreactive, imide compounds are also mentioned inter alia. These compounds reducing the melt viscosity should preferably have boiling points of at least 250° C. and melting points of at least 100° C., so that they do not substantially lower the glass transition point of the polyester. Naturally, extraction can here be used only in the case of relatively thin molded structures. By contrast, large quantities of low-molecular compounds cannot be added to polyester raw materials for injection-molded articles, and can even less be extracted again after molding, without altering the mechanical and physical properties of the articles to such an extent that they are virtually no longer useable.

It is therefore the object of the present invention to provide rapidly crystallizing polyester molding compositions which show the disadvantages of the state of the art at least only to a reduced extent or not at all.

The invention therefore relates to a polyester molding composition, comprising substantially (A) a polyester of a reduced specific viscosity (measured at 25° C. in a 1% solution in dichloroacetic acid) of at least 0.3 dl/g,
(B) a nucleating agent,
(C) a low-molecular organic compound as a crystallization accelerator and,
(D) if appropriate, reinforcing agents or other additives, wherein (C) is an organic imide compound which ($\alpha$) contains, per molecule, at least one imide group which is substituted by an aliphatic radical having at least 5 carbon atoms, or ($\beta$) is an imide-ester compound in which the imide group is substituted by an aliphatic radical having at least 2 carbon atoms or by the radical of an aromatic carboxylic acid ester, and has a melting point below 200° C. and is present in a quantity sufficient to reduce the crystallization temperature of the molding composition by at least 4° C. as compared with that without (C).

The polyester according to component (A) of the molding composition according to the invention can, in principle, be any known crystallizable, linear or slightly branched polyester, such as are described, for example, in (R. E. Wilfong, J. Polymer Sci. 54, pages 385–410 (1961), or in Ullmanns Enzyklopädie der technischen Chemie [Ullmann's Encyclopedia of Industrial Chemistry] (4th edition) 19, pages 61–68 (1980). However, polyethylene terephthalate is preferred. An example of another polyester which can also be used according to the invention is polycyclohexane-1,4-dimethylol terephthalate.

Other suitable polyesters contain, as the acid components in addition to terephthalic acid, up to 20 mol percent, preferably up to 10 mol percent, of other aromatic, araliphatic or aliphatic dicarboxylic acids and/or up to 2 mol percent, preferably up to 1 mol percent, of trifunctional or polyfunctional carboxylic acids and, as the diol component in addition to butylene glycol or preferably ethylene glycol, up to 20 mol percent, preferably up to 10 mol percent of aromatic, araliphatic or other aliphatic diols and/or up to 2 mol percent, preferably up to 1 mol percent, of trihydric or polyhydric alcohols.

Examples of the dicarboxylic acids and trifunctional or polyfunctional carboxylic acids referred to here are isophthalic acid, phthalic acid, alkyl-substituted phthalic acids, alkyl-substituted isophthalic acids or alkyl-substituted terephthalic acids, naphthalenedicarboxylic acids such as, for example, 2,6-naphthalenedicarboxylic acid and 2,7-naphthalenedicarboxylic acid, aliphatic dicarboxylic acids such as, for example, succinic acid, adipic acid, sebacic acid or decanedicarboxylic acid, alicyclic dicarboxylic acids such as, for example, cyclohexanedicarboxylic acids, trimesic acid, trimellitic acid or pyromellitic acid.

Examples of the diol components or the trihydric or polyhydric alcohols referred to above are trimethylene glycol, 1,2-propanediol, hexamethylene glycol, neopentyl glycol, diethylene or triethylene glycol, 1,4-cyclohexane dimethanol, di- or poly-hydroxybenzenes such as, for example hydroquinone or resorcinol, bisphenols such as, for example, bisphenol A and bisphenol F, and aromatic diols such as, for example, ether-diols of bisphenols and glycols, trimethylolpropane or pentaerythritol. Linear oligo- or polyesters or oligo- or polyethers each having two terminal hydroxyl groups and molecular weights of up to 10,000 g/mol or preferably up to 5,000 g/mol, particularly preferably up to 2,000 g/mol, can also be chosen as the diol components. These include, for example, polytetrahydrofurans and polyethylene oxides having molecular weights of 400 to 2,000 g/mol. Instead of or in addition to these co-components, the polyester according to the invention can also contain up to 20 mol percent, preferably up to 10 mol percent, of hydroxycarboxylic acids such as, for example, ε-hydroxycaproic acid, hydroxybenzoic acid or hydroxyethoxybenzoic acid.

Apart from the homopolyesters and copolyesters based on polybutylene terephthalate or polyethylene terephthalate themselves, the polyester used can also be a mixture of homopolyesters and copolyesters such as, for example, a mixture of polybutylene terephthalate and polyethylene terephthalate, or mixtures of one or more of the said homopolyesters or copolyesters with at least one further polyester, such as, for example, mixtures of polyethylene terephthalate and a polyester based on bisphenol A/isophthalic acid/terephthalic acid, as the component (A).

The polyester used according to the invention has a reduced specific viscosty, measured at 25° C. as a 1% solution in dichloroacetic acid, of at least 0.3 dl/g, preferably of at least 0.5 dl/g and particularly preferably of at least 0.6 dl/g.

The nucleating agents used according to component (B) of the molding compositions according to the invention are the compounds known in polyesters for this purpose, for example talc, titanium dioxide, mica, silica and the like. Preferably, an alkali(ne earth) metal or alkali(ne earth) metal compounds are used according to the invention for this purpose. The term "alkali(ne earth) metal" is here meant to comprise both the alkaline earth metals and the alkali metals, the latter being preferred. The preferred alkaline earth metals are magnesium and calcium, and the preferred alkali metals are lithium, sodium and potassium. Sodium is here particularly preferred. Alloys of these metals with one another or with other metals, as are described in German Offenlegungsschrift No. 1,804,914, can be used according to the invention.

Suitable compounds of the alkali(ne earth) metals are generally all compounds of these metals with H-acid inorganic or organic compounds, provided that they do not adversely affect the transesterification or polycondensation.

Examples of inorganic compounds of the alkali(ne earth) metals, preferably of sodium, are the corresponding silicates, phosphates, phosphites, sulfates or preferably carbonates, hydrogen carbonates and hydroxides.

Organic compounds of the alkali(ne earth) metals, preferably of sodium, include the corresponding salts of aliphatic, araliphatic or aromatic carboxylic acids, having preferably up to 30 carbon atoms and preferably 1 to 4 carboxyl groups. Examples of these are the alkali metal salts of formic acid, acetic acid, propionic acid, butyric acid, isobutyric acid, caprylic acid, stearic acid, cyclohexane carboxylic acid, succinic acid, adipic acid, suberic acid, 1,10-decanedicarboxylic acid, 1,4-cyclohexanedicarboxylic acid, terephthalic acid, 1,2,3-propanetricarboxylic acid, 1,3,5-cyclohexanetricarboxylic acid, trimellitic acid, 1,2,3,4-cyclopentanetetracarboxylic acid, pyromellitic acid, benzoic acid and substituted benzoic acids, as well as neutral or partially neutralized Montan wax salts of Montan wax ester salts (montanates).

Salts with acid radicals of different types such as, for example, alkali metal paraffin-sulfonates, alkali metal olefin sulfonates and alkali metal aryl-sulfonates or also phenolates and alcoholates such as, for example, methanolates, ethanolates and glycolates, can also be used according to the invention. Preferably, sodium carbonate, sodium hydrogen carbonate, sodium hydroxide, sodium salts of mono- and poly-carboxylic acids, in particular the salts of aliphatic mono- and poly-carboxylic acids having preferably 2 to 18 carbon atoms, in particular 2 to 6 carbon atoms, and up to 4, preferably up to two carboxyl groups, and sodium alcoholates having preferably 2 to 15 carbon atoms, especially 2 to 8 carbon atoms, are used. Examples of particularly preferred representatives are: sodium acetate, sodium propionate, sodium butyrate, sodium oxalate, sodium malonate, sodium succinate, sodium methylate, sodium ethylate and sodium glycolate. Mixtures of different alkali(ne earth) metal compounds can also be used.

The quantity of nucleating agent is in general $2 \times 10^{-3}$ to 0.1 mol and preferably $5 \times 10^{-3}$ to $6 \times 10^{-2}$ mol per kg of polyester.

The crystallization accelerator (component (C)) used in the molding composition according to the invention is an organic imide compound which contains, per molecule, at least one imide group which is substituted by an aliphatic radical having at least 5 carbon atoms, the melting point being below 200° C., preferably below 150° C. and particulary preferably below 100° C. An adequate effect as a crystallization accelerator is not obtained with imide compounds melting above 200° C.

The organic imide compound is preferably derived from an aromatic dicarboxylic or tetracarboxylic acid and is of one of the following general formulae (I), (II) or (III):

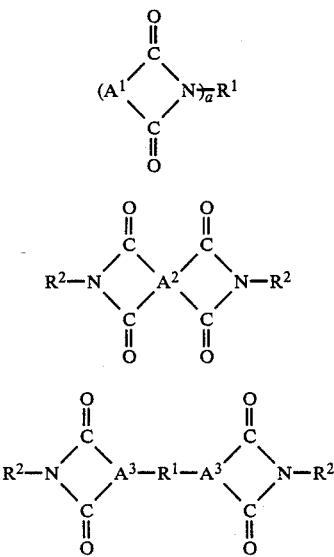

wherein $A^1$ is a divalent, unsubstituted or substituted aromatic radical, for example, 1,2-phenyl or 1,2-, 2,3- or 1,8-naphthyl. Possible substituents are above all $C_{1-6}$-alkyl, halogen, alkoxy groups having preferably 1 to 4 carbon atoms and carboxylic ester groups having 1 to 18 and preferably 1 to 4 carbon atoms in the alcohol moiety;

in the case of a=2, the two radicals $A^1$ can be identical or different;

$R^1$ is a branched or unbranched, unsubstituted or substituted aliphatic radical having at least 5 carbon atoms, preferably 8 to 20 carbon atoms, the carbon chain having no multiple bonds and reactive substituents. However, it can contain heteroatoms such as O, S or NR' (R'=$R^1$; in addition $C_{1-4}$-alkyl), atom groupings such as —C(=O)—O— or —C(=O)—NH—, $SO_2$ and/or cycloalkyl or aryl groups, for example especially phenyl groups.

The valency of $R^1$ corresponds to that of a. Examples of such radicals are given by the formulae which follow;

a=1 or 2;

$A^2$ is a tetravalent aromatic radical such as

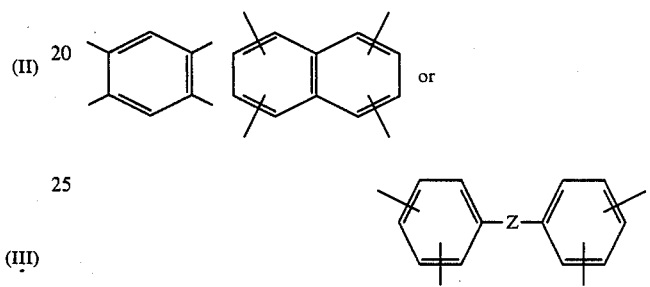

with Z=—$CH_2$—, —O—, —$SO_2$— or —CO—; this radical can be substituted, for example as described above for $A^1$;

$R^2$=$R^1$; the radicals can here be identical or different;

$A^3$ is an aromatic ring system having 6 to 10 carbon atoms, and these radicals can be identical or different.

Examples of such imide compounds are the following compounds, m and n being integers from 5 to 18, p being integers from 12 to 24, q being integers from 1 to 18, x being numbers ≧2, preferably 2 to 18, and y being numbers ≧3, preferably 3 to 50:

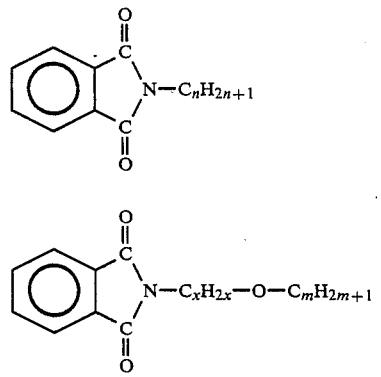

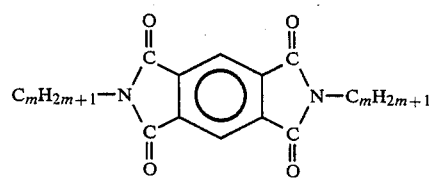

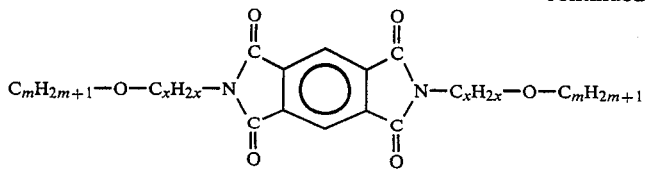
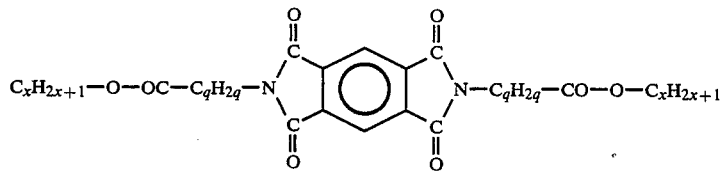
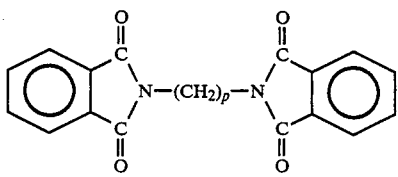
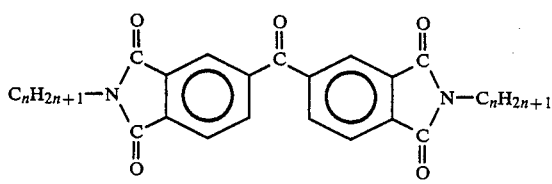
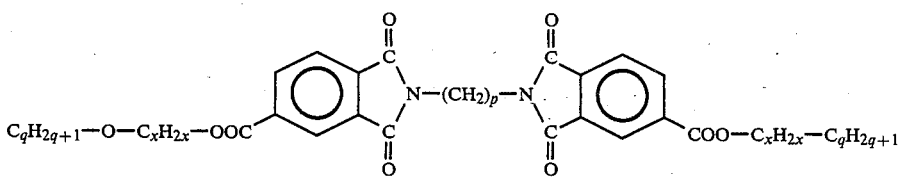
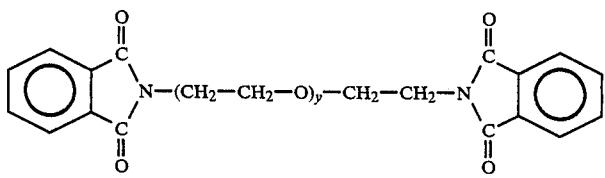
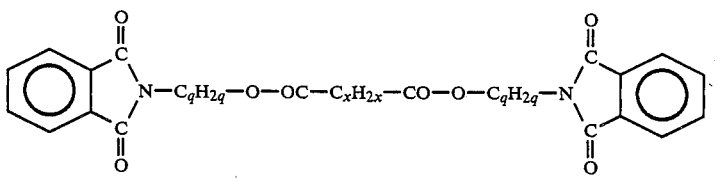
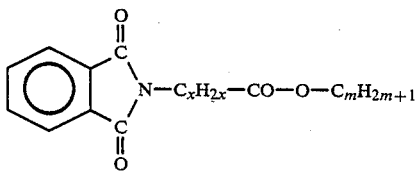
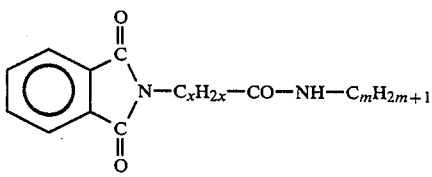

-continued

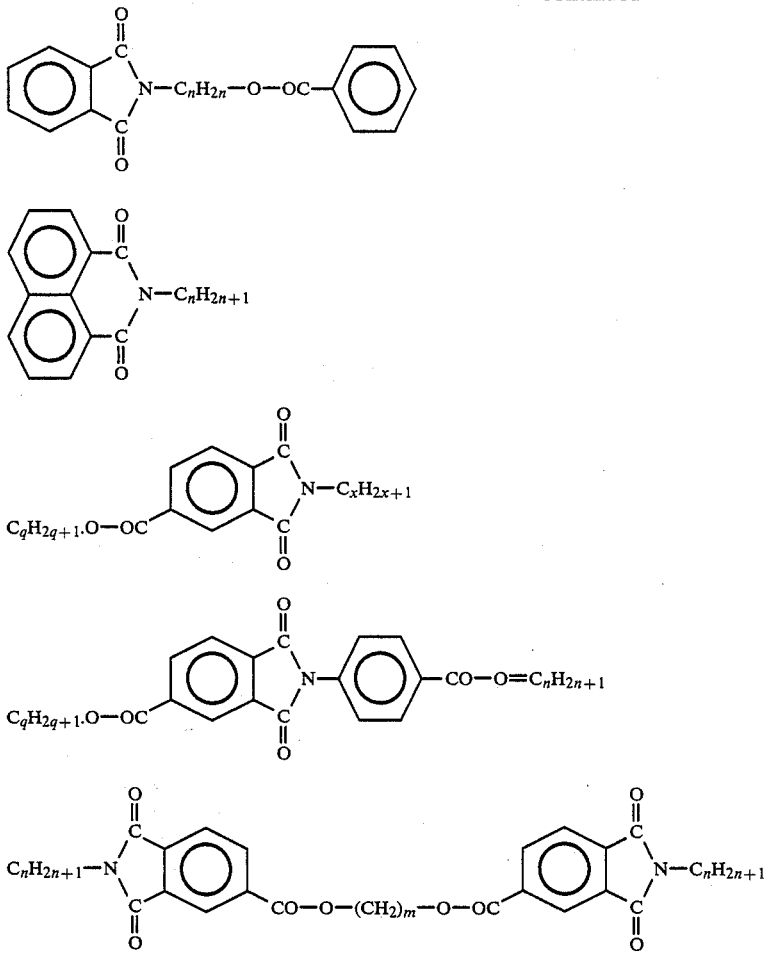

Actual representatives of component (C) are: N-(n-octyl)-phthalimide, N-(n-decyl)-phthalimide, N-(n-dodecyl)-phthalimide, N-(n-tetradecyl)-phthalimide, N-(n-hexadecyl)-phthalimide, N-(n-octadecyl)-phthalimide, N,N'-bis-(n-octyl)-pyromellitic acid diimide, N,N'-bis-(n-dodecyl)-pyromellitic acid diimide, 1,6-bis-(phthalimido)-hexane, 1,6-bis-(4-butoxyethoxycarbonyl-phthalimido)-hexane, N,N'-bis-(ethoxycarbonyl-pent-5-yl)-pyromellitic acid diimide, 6-phthalimido-hexanoic acid n-butylamide, 1,12-bis-(phthalimido)-dodecane, 1,12-bis-(phthalimido)-4,9-dioxa-dodecane, 1-benzoyloxy-3-phthalimido-propane, N,N'-bis-(2'-ethylhexyloxycarbonyl-pent-5-yl)-pyromellitic acid diimide, bis-(3-phthalimidopropyl) adipate, N,N'-bis-(3-isononyloxypropyl)-pyromellitic acid diimide, N-(n-dodecyl)-1,8-naphthalimide, N-(n-tetradecyl)-1,8-naphthalimide, N-(n-hexadecyl)-1,8-naphthalimide, N-(3-isononyloxypropyl)-1,8-naphthalimide and octadecyl N-isobutylphthalimide-4-carboxylate.

These examples are only a selection from the large number of possible structures according to the invention and do not represent a restriction of the invention. In an individual case, the imide compound selected should have such a structure that it is soluble in the polyester melt completely or at least partially, preferably to an extent of at least 10%, especially to an extent of at least 50%, and has a melting point below 200° C. and especially below 100° C.

The crystallization accelerators are employed in a quantity sufficient to lower the crystallization temperature $T_k$ of the polyester composition by 4° C. to 50° C., preferably by 6° C. to 30° C. and especially by 9° C. to 20° C., as compared with an otherwise identical composition of the same molecular weight, but without the crystallization accelerator. In general, this requires quantities of 0.1 to 12% by weight, preferably 1 to 8% by weight and particularly preferably 3 to 7% by weight, relative to the mixture of (A) to (C).

Surprisingly, the imide compounds according to the invention have a crystallization-accelerating effect on the polyester and are virtually unreactive with the polyester, so that they virtually do not degrade the latter during incorporation and processing. In addition, they have a higher migration resistance than the crystallization accelerators hitherto known.

In addition, the polyester compositions according to the invention can, if appropriate, also contain, as the component (D), the known reinforcing agents such as, for example glass fibers, carbon fibers, metal carbide fibers, glass beads and the like, such as are described, for example, in German Pat. No. 2,920,246 and U.S. Pat. No. 4,483,955. Their quantity is in general between 0 and 150 parts by weight, preferably between 0 and 100 parts by weight, per 100 parts by weight of the polyester. These additives can be added at any suitable point in the production sequence of the polyester compositions according to the invention.

Furthermore, the polyester compositions according to the invention can contain known additives such as, for example, fillers, flameproofing agents, impact modifiers, stabilizers, mold release agents, antistatics or the like. Such additives are described, for example, in German Pat. No. 2,920,246 or in R. Gächter and H. Müller, Kunststoff-Additive [Plastics Additives], Carl Hanser Verlag 1983 (Munich, Vienna).

The molding compositions obtainable according to the invention allow the production of moldings of high heat distortion point and high dimensional stability, such as, for example, gear wheels and bevel gears, geared racks, clutch disks, guide elements, components for electronic apparatus, and the like.

The molding composition according to the invention can be prepared by mixing of the constituents in any desired manner. For example, the dry polyester (A) can be mixed with the constituents (B) and (C) in a suitable mixing device or drum, and the mixture can then be melt-extruded. The extrudate can then be mixed again in a second stage with further additives, for example reinforcing fibers, in a suitable compounding extruder, and melt-extruded. Advantageously, however, all the envisaged constituents are mixed in one step and melt-extruded.

It is also possible, however, to proceed as in German Offenlegungsschrift No. 3,532,033. According to the latter, a nucleated or highly nucleated polyester is initially prepared in a first stage in the presence of an alkai(ne earth) metal or an alkali(ne earth) metal compound, whereupon further un-nucleated polyester, if appropriate, and the crystallization accelerator (C) are then added to the above polyester in the second stage. This procedure has a number of advantages and is therefore preferred as a rule. In detail, the preparation of the polyester molding compositions according to the invention is accordingly carried out in such a way that the polyester (A) is prepared first and, if appropriate, the components (B) and (D) as well as component (C) are then added, the polyester (A) being prepared by the esterification/polycondensation process and/or the transesterification/polycondensation process, at least a part of the polyester being prepared in the presence of an alkali(ne earth) metal or an alkali(ne earth) metal compound, so that a nucleated or highly nucleated polyester initially results in the first stage and subsequently, in the second stage, further un-nucleated polyester, if appropriate, and the crystallization accelerator (C) are added to this polyester, the quantity of the accelerator being such that the crystallization temperature is lowered by at least 4° C. as compared with that of the polyester without this organic crystallization accelator. The reduced specific solution viscosity, determined on one-percent solutions of the samples in dichloroacetic acid (c=1 g/dl) at 25° C., is taken as a measure of the molecular weights of the polyester samples investigated. Regarding the measurement method, see also M. Hofmann, H. Krömer and R. Kuhn, Polymeranalytik I [Polymer Analysis], Georg Thieme Verlag, Stuttgart (1977). From the measured running times of solution (t) and solvent ($t_o$), together with the weight fraction of the polyester x (including both nucleated, highly nucleated and un-nucleated polyester) contained in the particlar sample, the reduced specific solution viscosity is obtained by the following equation:

$$\eta_{red} = \frac{[t_o^{-1} \cdot (t - t_o)] - 1}{c \cdot x}$$

The crystallization behaviour was assessed by differential calorimetry, using the Perkin-Elmer DSC-2C apparatus. To obtain always the same thermal history, all samples (ground granules) were each melted, before the measurement, for 5 minutes at 290° C. under a nitrogen atmosphere and then quenched to about 0° C. In the subsequent measurement cycle, the samples were heated at 10° C./minute from room temperature to 290° C. under a nitrogen atmosphere and then cooled directly at 20° C./minute. When heating the quenched samples, an exothermic crystallization peak appears in the measurement cycle, and the maximum of this peak is below designated the crystallization temperature $T_C$. On cooling from the melt, the samples likewise show a crystallization peak, the maximum of which is designated below as the recrystallization temperature $T_R$.

The crystallization behavior of the polyester is then the better, the higher $T_R$ and the lower $T_C$. These two temperatures are, in a manner of speaking, a measure of the temperature range in which the crystallization of the polyester can proceed. As compared with un-nucleated samples of the same molecular weight, nucleated samples show both higher recrystallization temperatures $T_R$ and lower crystallization temperatures $T_C$ and hence already an improved crystallization behavior. The recrystallization temperature is virtually unaffected by the further addition of organic crystallization accelerators, but the crystallization temperature is lowered further, that is to say the crystallization can then also take place at even lower temperatures. At the same time, the processing behavior of the polyester is thus also improved further. For example, lower temperatures can then be used in the injection-molding process, and the mold release behavior and surface gloss of the molding are favorably affected.

It is known that the crystallization behavior depends on the molecular weight of the polyesters and hence on the solution viscosity. For this reason, only those measured values are directly comparable which were measured on samples of virtually the same molecular weight or the same solution viscosity. As a measure of the molecular weights of the polyester samples, their reduced specific solution viscosity $\eta_{red.}$ is taken, which is determined on 1% solutions in dichloroacetic acid at 25° C. When measuring polyester samples with added crystallization accelerators, the reduced specific viscosity is calculated from the corresponding weight fraction of the polyester.

EXAMPLES 1 TO 25 AND COMPARISON EXAMPLES 1 TO 3

875 parts of polyethylene terephthalate having a reduced specific viscosity of 0.82 were mixed with 125 parts of polyethylene terephthalate prepared by addition of 2.1% of sodium acetate to the transesterification and thus having a content of 256 mmol of Na/kg, so that the sodium content of the mixture was 32 mmol/kg.

In Comparison Tests 1 and 2, this polyester mixture nucleated with sodium was melt-extruded without an addition of an organic crystallization accelerator and the crystallization properties were measured by DSC (Differential Scanning Calorimetry).

In Examples 1 to 25 and Comparison Example 3, the organic crystallization accelerators were added in the indicated percentage quantities, relative to the polyester, to the polyethylene terephthalate mixture with 32 mmol of Na/kg, and thoroughly mixed in, and this mixture was melt-extruded by means of a twin-screw extruder. Table 1 with Examples 1 to 13 and Comparison Example 1 lists the tests which gave polyester samples of reduced specific viscosities of about 0.7 dl/g, and Table 2 with Examples 14 to 25 and Comparison Examples 2 and 3 lists the tests with viscosities of about 0.8 dl/g, in order to ensure comparability of the crystallization properties. The effectiveness of the imide compounds according to the invention as crystallization accelerators is evident from a comparison of the crystallization temperatures $T_C$. Comparison Example 3 shows that an imide compound which is not according to the invention and which contains a cycloaliphatic ring system instead of a relatively long aliphatic chain between two imide groups, has only a very low effectiveness as a crystallization accelerator.

EXAMPLES 26 AND 27 AND COMPARISON EXAMPLES 4 TO 6

The procedure followed was as in the preceding examples, but with the difference that high-molecular polyesters with $\eta_{red.}=1.25$ and 1.23 dl/g, which had been obtained by solid-phase post-condensation, were used, respectively, as the polyethylene terephthalate and as the polyethylene terephthalate master batch nucleated with sodium acetate.

In Comparison Example 4, the polyester mixture was melt-extruded without addition of an imide compound, showing the crystallization properties of a polyester only nucleated with sodium.

In Comparison Examples 5 and 6, ester compounds belonging to the state of the art were used as crystallization accelerators in the same percentage quantities as the imide compounds in Examples 26 and 27.

Table 3 lists the test results. A comparison of the solution viscosities of the polyester extrudates obtained shows that the ester compounds in Comparison Examples 5 and 6 markedly degrade the polyester during melt extrusion, whereas the imide compounds in Examples 26 and 27 do not cause any viscosity drop of the polyester during the melt extrusion. Even though the crystallization temperatures $T_C$ have also been lowered by the addition of the ester compounds, an exact comparison is impossible because of the different molecular weight of the polyester products. If the crystallization temperatures were extrapolated to the higher polyester viscosity of Examples 26 and 27, the $T_C$ values of the Comparison Examples would be a few °C. higher. However, knowledge of the exact relationship for an extrapolation is lacking.

TABLE 1

| | | Polyester mixture: Measured DSC results* | | | | | |
|---|---|---|---|---|---|---|---|
| Example | Organic crystallization accelerator | DSC $T_m$ °C. | % by weight added | $\eta_{red.}$ dl/g | $T_G$ °C. | $T_C$ °C. | $T_R$ °C. |
| 1 | N—(n-octyl)-phthalimide | 48 | 4 | 0.72 | 68 | 114 | 207 |
| 2 | " | 48 | 5 | 0.71 | 63 | 110 | 208 |
| 3 | " | 48 | 7 | 0.69 | 56 | 104 | 209 |
| 4 | N—(n-dodecyl)-phthalimide | 65 | 4 | 0.70 | 63 | 108 | 208 |
| 5 | " | 65 | 6 | 0.71 | 59 | 104 | 209 |
| 6 | N—(n-octadecyl)-phthalimide | 79 | 4 | 0.70 | 69 | 114 | 210 |
| 7 | N,N'—bis-(n-octyl)-pyromellitic acid diimide | 180 | 5 | 0.72 | 70 | 115 | 209 |
| 8 | " | 180 | 6 | 0.71 | 68 | 114 | 208 |
| 9 | N,N'—bis-(n-dodecyl)-pyromellitic acid diimide | 159 | 6 | 0.71 | 73 | 118 | 209 |
| 10 | 1,6-bis-(phthalimido)-hexane | 180 | 6 | 0.70 | 70 | 115 | 208 |
| 11 | 1,6-bis-(4-butoxyethoxycarbonyl-phthalimido)-hexane | 79 | 6 | 0.72 | 72 | 115 | 212 |
| 12 | N,N'—bis-(ethoxycarbonylpent-5-yl)-pyromellitic acid diimide | 137 | 6 | 0.70 | 68 | 111 | 212 |
| 13 | 6-phthalimido-hexanoic acid n-butylamide | 119 | 6 | 0.69 | 66 | 111 | 211 |
| Comparison Example 1 | — | — | — | 0.72 | 79 | 124 | 208 |

*Abbreviations:
DSC = Differential scanning calorimetry
$T_m$ = Melting point
$\eta_{red}$ = Reduced specific solution viscosity
$T_G$ = Glass transition temperature
$T_C$ = Crystallization temperature
$T_R$ = Recrystallization temperature

TABLE 2

| | | Polyester mixture: Measured DSC results* | | | | | |
|---|---|---|---|---|---|---|---|
| Example | Organic crystallization accelerator | DSC $T_m$ °C. | % by weight added | $\eta_{red.}$ dl/g | $T_G$ °C. | $T_C$ °C. | $T_R$ °C. |
| 14 | N—(n-dodecyl)-phthalimide | 65 | 5 | 0.81 | 66 | 110 | 208 |
| 15 | " | 65 | 6 | 0.80 | 63 | 107 | 208 |
| 16 | " | 65 | 7 | 0.80 | 63 | 106 | 208 |
| 17 | 1,12-bis-(phthalimido)-dodecane | 119 | 4 | 0.75 | 71 | 116 | 208 |
| 18 | " | 119 | 6 | 0.75 | 69 | 114 | 209 |
| 19 | 1,12-bis-(phthalimido)-4,9- | 114 | 4 | 0.76 | 70 | 115 | 210 |

TABLE 2-continued

| | | Polyester mixture: Measured DSC results* | | | | | |
|---|---|---|---|---|---|---|---|
| Example | Organic crystallization accelerator | DSC $T_m$ °C. | % by weight added | $\eta_{red.}$ dl/g | $T_G$ °C. | $T_C$ °C. | $T_R$ °C. |
| | dioxadodecane | | | | | | |
| 20 | " | 114 | 6 | 0.75 | 67 | 114 | 207 |
| 21 | 1-Benzoyloxy-3-phthalimido-propane | 79 | 5 | 0.75 | 68 | 113 | 210 |
| 22 | N,N'—bis-(2'-ethylhexylcarbonyl-pent-5-yl)-pyromellitic acid diimide | 67 | 5 | 0.80 | 71 | 113 | 211 |
| 23 | " | 67 | 7 | 0.82 | 71 | 111 | 211 |
| 24 | Bis-(3-phthalimidopropyl) adipate | 96 | 6 | 0.80 | 71 | 111 | 212 |
| 25 | " | 96 | 7 | 0.79 | 69 | 110 | 212 |
| Comparison Example | | | | | | | |
| 2 | — | — | — | 0.80 | 79 | 125 | 205 |
| 3 | 1,3-bis-(phthalimidomethyl)-cyclohexane | 191 | 6 | 0.78 | 75 | 121 | 206 |

*For abbreviations see Table 1

TABLE 3

| | | Polyester mixture: Measured DSC results* | | | | | |
|---|---|---|---|---|---|---|---|
| Example | Organic crystallization accelerator | DSC $T_m$ °C. | % by weight added | $\eta_{red.}$ dl/g | $T_G$ °C. | $T_C$ °C. | $T_R$ °C. |
| 26 | N—(n-dodecyl)-phthalimide | 65 | 6 | 1.17 | 65 | 111 | 205 |
| 27 | N,N'—bis-(n-octyl)-pyromellitic acid diimide | 180 | 6 | 1.17 | 71 | 117 | 205 |
| Comparison Example | | | | | | | |
| 4 | — | — | — | 1.18 | 80 | 126 | 207 |
| 5 | Neopentyl glycol dibenzoate | 51 | 6 | 1.08 | 67 | 113 | 209 |
| 6 | Glycerol tribenzoate | 69 | 6 | 0.85 | 69 | 112 | 210 |

*For abbreviations see Table 1.

EXAMPLE 28

25 g of the rapidly crystallizing polyester mixture of Example 5, as cut strands, were dried overnight at 50° C. in a vacuum drying cabinet and then washed for 10 minutes with toluene, in order to remove the surface fraction of the crystallization accelerator. The isolated granules were heat-treated for 96 hours in a vessel covered with aluminum foil at 140° C. in a drying cabinet. The cooled polyester granules were then stirred for 10 minutes with 50 ml of toluene, the polyester granules were filtered off, and the N-(n-dodecyl)-phthalimide washed off from the surface of the polyester was determined in the solution by means of HPLC chromatography (High-Pressure Liquid Chromatography). The toluene solution contained 0.0055% of the imide compound which, as a result of the heat treatment, had migrated from the interior of the polyester to the surface and had been washed off by the solvent.

COMPARISON EXAMPLE 7

Analogously to Examples 1 to 25, a rapidly crystallizing polyester mixture with 6 parts of neopentyl glycol dibenzoate per 100 parts of polyethylene terephthalate with 32 milliequivalents of Na/kg was prepared. 25 g of the polyester granules were treated analogously to Example 28 (simultaneous heat treatment) and washed off with the same quantity of toluene. In this washing solution, a neopentyl glycol dibenzoate content of 0.024% was determined, which represents a substantially more extensive migration to the polyester surface than that of the imide compound of Example 28.

COMPARISON EXAMPLE 8

Analogously to Comparison Example 7, a rapidly crystallizing polyester containing 6 parts of bis-(2-phenoxyethyl) adipate per 100 parts of polyethylene terephthalate was treated. In the toluene washing solution, a content of 0.011% of the organic crystallization accelerator was determined, which thus also represents a substantially more extensive migration than that of the imide compound in Example 28.

I claim:

1. A polyester molding composition, comprising substantially
   (A) a polyester of a reduced specific viscosity (measured at 25° C. in a 1% solution in dichloroacetic acid) of at least 0.3 dl/g,
   (B) a nucleating agent in the form of an alkali metal compound
   (C) a low-molecular organic compound as a crystallization accelerator in the presence or absence of
   (D) reinforcing agents or other additives, wherein (C) is an organic imide compound which comprises one or more aromatic nuclei and is of the formula

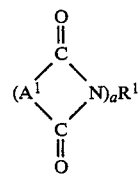

(I)

in which A¹ is a substituted or unsubstituted divalent aromatic radical, R¹ is a branched or unbranched, unsubstituted or substituted aliphatic radical of valency a, having at least 5 carbon atoms and containing at least one —C(=O)—NH— group, and a is 1 or 2, which component (C) has a melting point below 200° C. and is present in a quantity sufficient to reduce the crystallization temperature of the molding composition by at least 4° C. as compared with that without (C).

2. A composition as claimed in claim 1, wherein the organic imide compound (C) has a melting point below 150° C., the substituent on the imide nitrogen is an aliphatic carboxylic acid amide containing chain having 8 to 20 carbon atoms and is present in a quantity of 1 to 8% by weight, relative to the mixture of (A) to (C).

3. A composition as claimed in claim 1, wherein the groupings with heteroatoms in the radical R¹ are carboxylic acid amide groups having at least 8 carbon atoms.

4. A composition as claimed in claim 1, wherein the polyester (A) is polyethylene terephthalate or a mixture of polyethylene terephthalate and polybutylene terephthalate.

5. A composition as claimed in claim 1, wherein the alkali metal compound is a sodium salt of a monocarboxylic or polycarboxylic acid or a sodium alcoholate.

6. A composition as claimed in claim 1, wherein the melting point of (C) is below 100° C.

7. A composition as claimed in claim 1, wherein component (C) comprises a compound of the formula

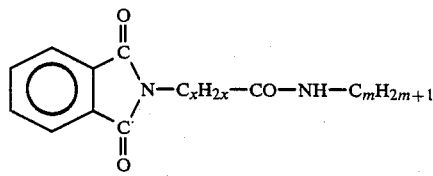

wherein m+x is greater than 5.

8. Moldings prepared from the molding composition as claimed in claim 1.

9. A process for preparing a polyester molding composition, comprising substantially
(A) a polyester of a reduced specific viscosity (measured at 25° C. in a 1% solution in dichloroacetic acid) of at least 0.3 dl/g,
(B) a nucleating agent in the form of an alkali metal compound,
(C) a low-molecular organic compound as a crystallization accelerator in the presence or absence of
(D) reinforcing agents and other additives, the polyester (A) being prepared first and components (B) and in the case component (D) is present, this component also, as well as component (C) then being added, wherein the preparation of the polyester (A) is carried out by the esterification/polycondensation process, the transesterification/polycondensation process or both, at least a part of the polyester being prepared in the presence of an alkali metal or an alkali metal compound, so that, in a first stage, a nucleated or highly nucleated polyester results initially, and the crystallization accelerator (C) alone or together with further un-nucleated polyester, then being added to this polyester in a second stage, the quantity of the crystallization accelerator being such that the crystallization temperature is reduced by at least 4° C. as compared with that of the polyester without this organic crystallization accelerator, (C) being an organic imide compound which comprises one or more aromatic nuclei and is of the formula

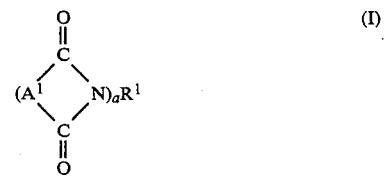

in which A¹ is a substituted or unsubstituted divalent aromatic radical, R¹ is a branched or unbranched unsubstituted or substituted aliphatic radical of valency a having at least 5 carbon atoms, and containing at least one —C(=O)—NH— group, and a is 1 or 2, which component (C) has a melting point below 200° C.

10. The process as claimed in claim 9, wherein the quantity of alkali metal or alkali metal compound in the first stage is $2 \times 10^{-2}$ to 1 mol per kg of the highly nucleated polyester, and wherein un-nucleated polyester of the same or a different chemical composition is added in the second stage.

11. The process as claimed in claim 9, wherein the quantity of the un-nucleated polyester added in the second stage is such that the quantity of alkali metal in the polyester (A) is $2 \times 10^{-3}$ to 0.1 mol per kg of this polyester.

12. The process as claimed in claim 9, wherein the transesterification/polycondensation process is used for preparing the polyester according to the first process stage.

13. A process as claimed in claim 9, wherein the organic imide compound (C) has a melting point below 150° C., the substituent on the imide nitrogen is an aliphatic carboxylic acid amide containing chain having 8 to 20 carbon atoms and is present in a quantity of 1 to 8% by weight, relative to the mixture of (A) to (C).

14. A process as claimed in claim 9, wherein the groupings with heteroatoms in the radical R¹ are carboxylic acid amide groups having at least 8 carbon atoms.

15. A process as claimed in claim 9, wherein the polyester (A) is polyethylene terephthalate or a mixture of polyethylene terephthalate and polybutylene terephthalate.

16. A process as claimed in claim 9, wherein the alkali metal compound is a sodium salt of a monocarboxylic or polycarboxylic acid or a sodium alcoholate.

17. A process as claimed in claim 9, wherein component (C) has a melting point below 100° C.

* * * * *